United States Patent
Li

(10) Patent No.: US 8,611,226 B2
(45) Date of Patent: Dec. 17, 2013

(54) METHOD, APPARATUS AND SYSTEM FOR EQUALIZING FLOWS

(75) Inventor: Liang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 12/916,186

(22) Filed: Oct. 29, 2010

(65) Prior Publication Data

US 2011/0044176 A1  Feb. 24, 2011

Related U.S. Application Data

(63) Continuation of application No. PCT/CN2009/071400, filed on Apr. 22, 2009.

(30) Foreign Application Priority Data

Apr. 29, 2008 (CN) .......................... 2008 1 0094393

(51) Int. Cl.
  *H04L 1/00* (2006.01)
(52) U.S. Cl.
  USPC .................. 370/238; 370/315; 370/395.51
(58) Field of Classification Search
  USPC .......................... 370/238, 351, 315
  See application file for complete search history.

(56) References Cited

U.S. PATENT DOCUMENTS

| | | | |
|---|---|---|---|
| 5,940,396 A * | 8/1999 | Rochberger | 370/408 |
| 6,535,927 B1 | 3/2003 | Kim | |
| 6,711,167 B1 | 3/2004 | Ikeda et al. | |
| 7,328,237 B1 | 2/2008 | Thubert et al. | |
| 2004/0208162 A1* | 10/2004 | Bergmann et al. | 370/351 |
| 2005/0025179 A1 | 2/2005 | McLaggan et al. | |
| 2006/0233175 A1 | 10/2006 | Ge et al. | |
| 2007/0258360 A1 | 11/2007 | Senga et al. | |
| 2007/0275724 A1 | 11/2007 | Kikuchi | |
| 2008/0098113 A1 | 4/2008 | Hansen et al. | |
| 2008/0273461 A1 | 11/2008 | Liang et al. | |

FOREIGN PATENT DOCUMENTS

| | | |
|---|---|---|
| CN | 1236240 A | 11/1999 |
| CN | 1236927 A | 12/1999 |
| CN | 1368814 A | 9/2002 |
| CN | 1512729 A | 7/2004 |

(Continued)

OTHER PUBLICATIONS

First Chinese Office Action issued in corresponding Chinese Patent Application No. 200810094393.1, mailed Aug. 17, 2010.

(Continued)

*Primary Examiner* — Steven H Nguyen
*Assistant Examiner* — Henry Baron
(74) *Attorney, Agent, or Firm* — Brinks Gilson & Lione

(57) ABSTRACT

A method, apparatus and system for equalizing flows are provided. The method includes: by a relay node, receiving a link setup request of the service flow sent from a source node; acquiring link load information of each bearer network between the source node and a destination node according to the link setup request of the service flow, and selecting a bearer network with a less link load to set up a forwarding link for a service flow; and forwarding the service flow according to the forwarding link. The technical solution provided by the invention implements the equalization of data flows forwarded on networks, and improves the bearer efficiency and transmission efficiency of bearer networks, thus saving the equipment purchase cost and maintenance cost.

10 Claims, 11 Drawing Sheets

(56) References Cited

FOREIGN PATENT DOCUMENTS

| | | | |
|---|---|---|---|
| CN | 1571395 A | 1/2005 |
| CN | 1622532 A | 6/2005 |
| CN | 1750498 A | 3/2006 |
| CN | 1826773 A | 8/2006 |
| CN | 1842051 A | 10/2006 |
| CN | 1842055 A | 10/2006 |
| CN | 1859259 A | 11/2006 |
| CN | 1968191 A | 5/2007 |
| CN | 101022423 A | 8/2007 |
| CN | 101277477 A | 10/2008 |
| JP | 9-289523 | 11/1997 |
| JP | 2000-32062 | 1/2000 |
| JP | 2000-101644 | 4/2000 |
| JP | 2006014137 | 1/2006 |
| JP | 2007318506 | 12/2007 |
| WO | WO 2004/028098 A1 | 4/2004 |
| WO | WO 2009/0132559 A1 | 11/2009 |

OTHER PUBLICATIONS

Office Action issued in corresponding Japanese patent Application No. 2011-506558, mailed Jul. 31, 2012.

Office Action issued in corresponding Japanese Patent Application No. 2011-506558, mailed Dec. 4, 2012.

* cited by examiner

METHOD, APPARATUS AND SYSTEM FOR EQUALIZING FLOWS

CROSS-REFERENCE TO RELATED APPLICATIONS

This application is a continuation of International Application No. PCT/CN2009/071400, filed on Apr. 22, 2009, which claims priority to Chinese Patent Application No. 200810094393.1, filed on Apr. 29, 2008, both of which are hereby incorporated by reference in their entireties.

FIELD OF THE INVENTION

The present invention relates to a communication technology, and in particular, to a method, apparatus and system for equalizing flows.

BACKGROUND OF THE INVENTION

A $3^{rd}$ Generation (3G) radio access network usually uses a microwave or metropolitan area optical transport network for data transmission between a base station and a base station controller. The mainstream mobile operators in this industry, such as Vodafone and Orange, carry out the wireless operations mainly by constructing microwave networks or leasing the transport networks of fixed network operators. The base station accesses the leased metropolitan area optical transport network through microwave, then the data flows from base stations are aggregated in the leased metropolitan area optical transport network, and the aggregated data flows are transmitted to the base station controller through a high-speed link. According to the traffic model, because the base stations will not reach the flow peak simultaneously, an aggregation node (or transport gateway) may be added at the first-level access point of the microwave network to aggregate the radio service data by packet switching, thus implementing the multiplexing of bandwidth. Therefore, the use of a service aggregation gateway can obviously improve the multiplexing efficiency of flows among the base stations to save the costs of purchasing microwave devices or leasing a metropolitan area optical transport network.

A first solution of the prior art related to the invention implements the transmission of an IP data flow on the ATM bearer network by using the IP over ATM (IPoA) protocol.

Herein, the standard IPoA protocol may implement the transmission of an IP data flow on the ATM bearer network, namely, support the transmission of a data flow of an IP base station on the ATM bearer network. The networking scheme is illustrated in FIG. 1. An IP base station transmits a data flow to an ATM switch 1 through an access layer of the IP Metropolitan Area Network (MAN) and the ATM switch 1 aggregates the data flow to an IP interface provided by the ATM switch 1; and the ATM switch 1 encapsulates received IP packet into a cell by using the IPoA protocol for the transmission on the ATM network (FIG. 1 illustrates the aggregation layer of the metropolitan area access network). An ATM switch 2 receives the cell and finishes the inverse process of the ATM switch 1 to reassemble the cell and recover the IPoA payload, namely, an IP packet.

FIG. 2 illustrates conversion of a protocol stack bearer in the first solution of the prior art. As illustrated, the ATM switches 1 and 2 actually use a tunnel, namely, a virtual channel, on the ATM network, to bear the IP packet, thus implementing the transmission of the IP packet on the ATM bearer network.

The inventor finds at least the following weaknesses in the first solution of prior art during the implementation of the invention:

1. Two sets of conversion devices are required, which increases the cost.

2. According to the IPoA protocol, the IP packet needs to undergo IPoA encapsulation and a tail is added, which reduces the bearer efficiency. During the transmission, encapsulation layers are added, so the transmission efficiency is reduced.

A second solution of the prior art related to the invention implements the transmission of an ATM data flow on the IP bearer network by using the Pseudowire Emulation Edge-to-Edge (PWE3) technology.

FIG. 3 illustrates a networking scheme of the second solution of the prior art. As illustrated, an ATM base station transmits a data flow to PWE3 equipment 1 through the access layer of the ATM MAN. An access ATM network may be accessed by using Inverse Multiplexing for ATM (IMA) over E1/T1, or ATM over Synchronous Digital Hierarchy (SDH) and connected to an ATM interface provided by the PWE3 equipment 1. The PWE3 equipment 1 encapsulates a received ATM cell into an IP packet by using the PWE3 protocol for the transmission on the IP network (FIG. 3 illustrates the aggregation layer of a metropolitan area access network). PWE3 equipment 2 finishes the inverse process of the PWE3 equipment 1 to disassemble the received IP packet into a cell and send the cell to a base station controller.

FIG. 4 illustrates conversion of a protocol stack bearer corresponding to FIG. 3. As illustrated, it can be seen that the PWE3 equipments 1 and 2 actually use a tunnel, namely, a PWE, on the IP network, to bear an ATM cell, thus implementing the transmission of the ATM cell on the IP bearer network.

The inventor finds that the second solution of the prior art has the similar weaknesses with the first solution during the implementation of the invention:

1. Two sets of conversion devices are required, which increases the cost.

2. The bearer efficiency is low. Meanwhile, because encapsulation layers are added, the transmission efficiency is reduced.

SUMMARY OF THE INVENTION

Embodiments of the present invention provide a method, apparatus and system for equalizing flows so as to improve the transmission efficiency of bearer networks.

An embodiment of the present invention provides a method for equalizing flows, including:

receiving, by a relay node, a link setup request of the service flow sent from a source node;

acquiring, by the relay node, link load information of each bearer network between the source node and a destination node according to the link setup request of the service flow, and selecting a bearer network with a less link load to set up a forwarding link for a service flow; and forwarding, by the relay node, the service flow according to the forwarding link.

An embodiment of the present invention further provides a system for equalizing flows, including: a source node, a relay node and a destination node.

The source node is configured to send a service flow and a link setup request of the service flow of the service flow.

The relay node is configured to: receive the link setup request of the service flow sent from the source node; acquire link load information of each bearer network between the source node and the destination node according to the link setup request of the service flow, and select a bearer network with a less link load to set up a forwarding link for the service flow; and forward the service flow according to the forwarding link.

The destination node is configured to receive the service flow forwarded by the relay node.

An embodiment of the present invention further provides an apparatus for equalizing flows, including:

a signaling receiving module configured to receive a link setup request of the service flow sent from a source node;

an acquiring module configured to acquire link load information of each bearer network between the source node and a destination node according to the link setup request of the service flow; and a link selecting module configured to select a bearer network with a less link load to set up a forwarding link for a service flow according to the link load information of the bearer network.

An embodiment of the present invention further provides a method for converting the ATM protocol stack into the IP protocol stack, including:

searching a local forwarding table according to header information of an ATM cell, and acquiring forwarding link information of the ATM cell; and when the forwarding link information indicates that the ATM cell is transmitted through an IP network, encapsulating the ATM cell into an IP packet, and forwarding the IP packet to an ATM/IP dual-stack base station controller; or encapsulating the ATM cell into an IP packet according to the forwarding link information, and forwarding the IP packet to an IP base station.

An embodiment of the present invention further provides a method for converting the IP protocol stack into the ATM protocol stack, including:

searching a local forwarding table according to header information of an IP packet, and acquiring forwarding link information of the IP packet; and when the forwarding link information indicates that the IP packet is transmitted through an ATM network, encapsulating the IP packet into an ATM cell, and forwarding the ATM cell to an ATM/IP dual-stack base station controller; or encapsulating the IP packet into an ATM cell according to the forwarding link information, and forwarding the ATM cell to an ATM base station.

In comparison with the prior art, the technical solution of the embodiments of the present invention has the following advantages:

Through the admission control of the signaling plane, during the setup of a data flow, the load sharing configuration of the data flow is carried out by the signaling negotiation according to the link load information of the current bearer networks, the utilization efficiency of the bearer networks is improved. In addition, the relay node simultaneously supports the ATM and IP network standard protocols, high encapsulation efficiency is implemented, and the utilization of the network bandwidth is improved. Further, the ATM/IP dual protocol stack device integrates the function of conversion between the ATM and IP standard protocols, and the equipment purchase cost and maintenance cost is effectively saved.

DETAILED DESCRIPTION OF THE EMBODIMENTS

The embodiments of the present invention provide a method, apparatus and system for equalizing flows.

The following describes the present invention in detail with reference to preferred embodiments and accompanying drawings.

The embodiments of the present invention are disclosed according to at least two available bearer networks between a source node and a relay node (such as a gateway, and an ATM/IP dual-stack Hub provided by the embodiments of the present invention), and/or between a relay node and a destination node of a service flow.

Figure 5:
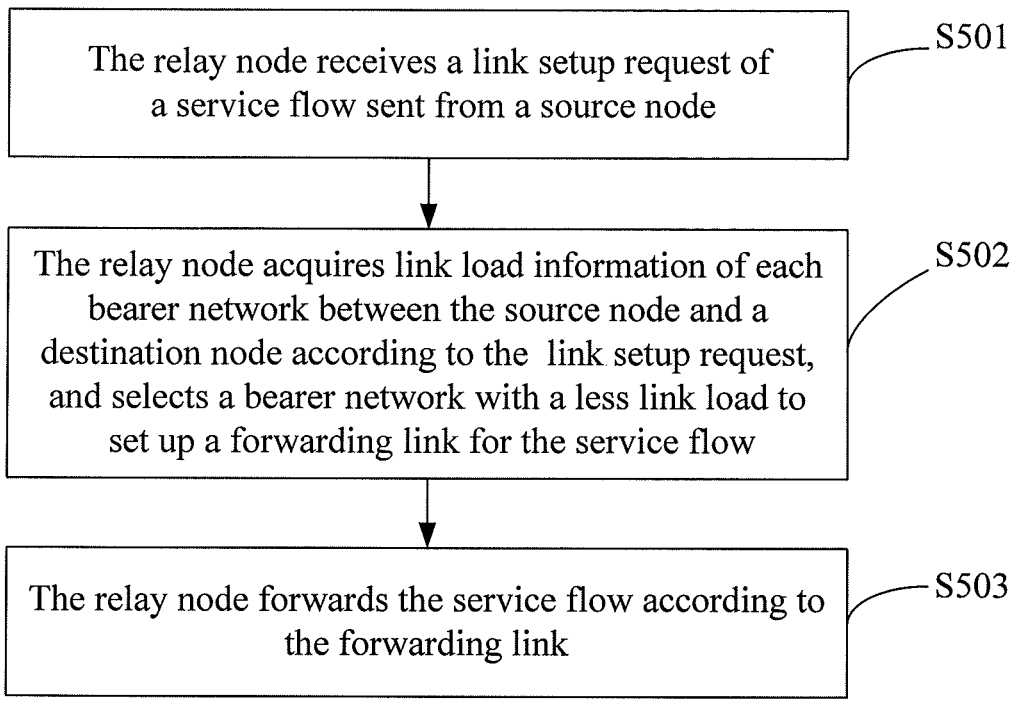
FIG. 5 illustrates a flowchart of a method for equalizing flows in an embodiment of the present invention.

An embodiment of the present invention provides a method for equalizing flows, as illustrated in FIG. 5. The relay node implements the operations of the following steps.

Step S501: Receive a link setup request of the service flow sent from a source node.

Step S502: Acquire link load information of each bearer network between the source node and the destination node according to the link setup request of the service flow, and select a bearer network with a less link load to set up a forwarding link for the service flow.

In the step S502, after selecting the bearer network with a less link load to set up a forwarding link for the service flow, the following operations are further provided: notify the link setup success message to the source node; and store information of the forwarding link of the service flow in a local forwarding table in the relay node.

Step S503: Forward the service flow according to the forwarding link.

The Step S503 further includes the following steps: Step S503.1: When receiving the service flow sent from the source node, search the local forwarding table according to the header information of the service flow, and acquire information of the forwarding link of the service flow.

Step S503.2: When the information of the forwarding link indicates that an ATM cell is transmitted through an IP network, encapsulate the ATM cell into an IP packet, and forward the encapsulated IP packet to the destination node (sent by IP routing).

Or when the information of the forwarding link indicates that an IP packet is transmitted through an ATM network, encapsulate the IP packet into an ATM cell, and forward the encapsulated ATM cell to the destination node (aggregating may be further implemented before sending).

After the relay node acquires the information of the forwarding link of the service flow, and the information indicates that the ATM cell is transmitted through the ATM network or that the IP packet is transmitted through the IP network, the forwarding processing is carried out directly without converting the protocols.

In the embodiment, when the relay node receives a link teardown request of the service flow, the information of the forwarding link of the service flow in the local forwarding table is removed according to the link teardown request and the local forwarding table is updated.

In the embodiment, the load sharing configuration of the data flow is carried out by the signaling negotiation among the relay node, the source node and the destination node according to the link load information of the current bearer networks. When receiving a data packet, the relay node searches for the information of the forwarding link in the local forwarding table to maintain the forwarding link according to the information of the forwarding link, thereby improving the utilization efficiency of the bearer networks.

In the embodiment, the local forwarding table may be subdivided into a packet forwarding table and a cell forwarding table. The packet forwarding table and the cell forwarding table may be individually stored (in this case, the two tables may be backed up and synchronization may be performed to implement the information consistency between the two tables and the corresponding backup tables for convenient search), or the packet forwarding table and the cell forwarding table may be integrated in a general local forwarding table.

Figure 6:
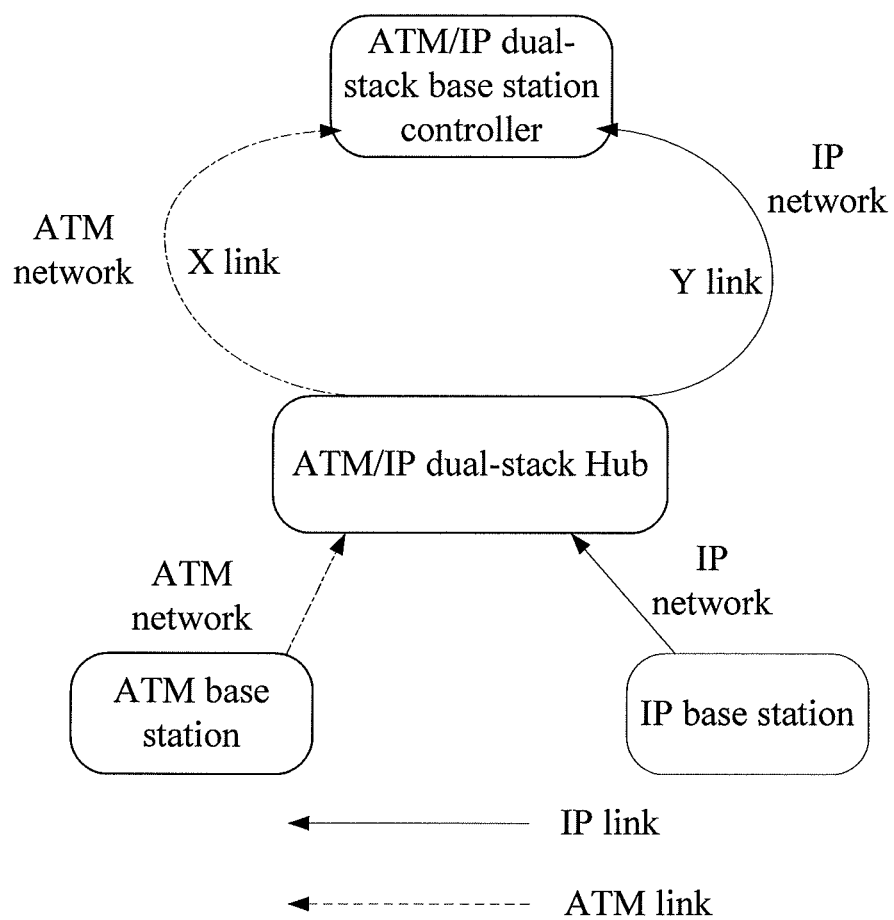
FIG. 6 illustrates a system architecture of an ATM/IP bearer network in an embodiment of the present invention.

Another embodiment of the present invention applies the method provided by the above embodiment to a specific scenario. The system architecture of the specific scenario is illustrated in FIG. 6, including: an ATM base station, an IP base station, an ATM/IP dual-stack Hub and an ATM/IP dual-stack base station controller. An X link taking the ATM network as the bearer network and a Y link taking the IP network as the bearer network are between the ATM/IP dual-stack base station controller and the ATM/IP dual-stack Hub. During the transmission of a service flow, when the source node is the IP base station or the ATM base station, the destination node of the service flow is the ATM/IP dual-stack base station controller, and the link that transmits the service flow is an uplink; when the source node of the service flow is the ATM/IP dual-stack base station controller, the destination node of the service flow is the IP base station or the ATM base station, and the link that transmits the service flow is a downlink. A relay node of the service flow is the ATM/IP dual-stack Hub.

The embodiment is further described in detail by taking the uplink in the architecture illustrated in FIG. 6 as an example.

Figure 7:
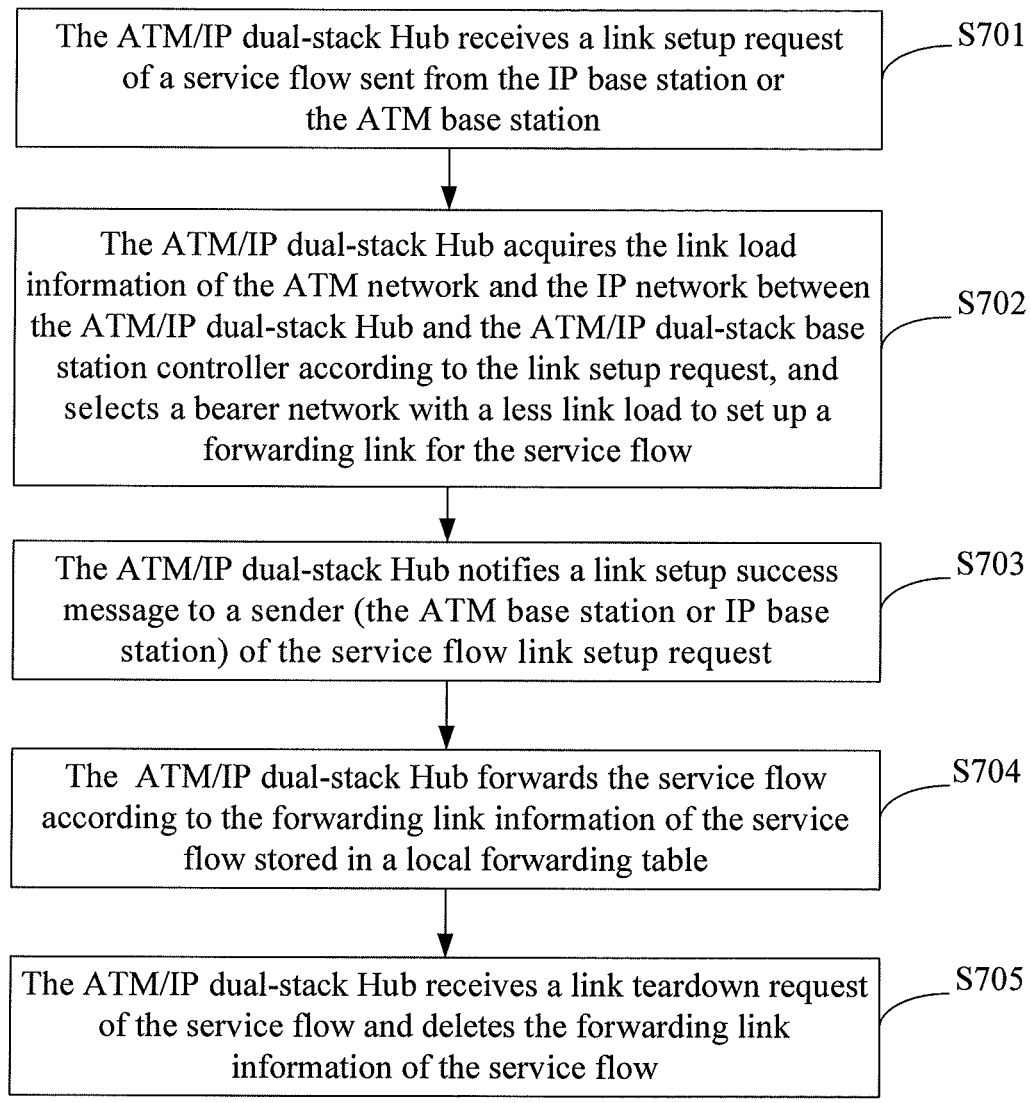
FIG. 7 illustrates a flowchart of a method for equalizing flows in another embodiment of the present invention.

As illustrated in FIG. 7, the method provide by the embodiment includes the following steps.

Step S701: The ATM/IP dual-stack Hub receives a link setup request of the service flow sent from an IP base station or an ATM base station. In the access network illustrated in FIG. 6, the setup and teardown of a data flow are implemented according to the transmission control signaling messages, which are the link setup request of the service flow and the link teardown request of the service flow.

Step S702: The ATM/IP dual-stack Hub acquires link load information of an ATM network and an IP network between the ATM/IP dual-stack Hub and the ATM/IP dual-stack base station controller according to the link setup request of the service flow, and selects a bearer network with a less link load to set up a forwarding link for the service flow.

In the Step S702, the ATM/IP dual-stack Hub may acquire the link load information of the current ATM network and IP network according to the flow statistics of ports of the X and Y links. If the current X link is with less link load, the service flow is configured be forwarded to the ATM/IP dual-stack base station controller through the X link. Conversely, the service flow is forwarded to the ATM/IP dual-stack base station controller through the Y link.

The step further includes: storing the forwarding link information of the service flow in a local forwarding table which may be a cell forwarding table or a packet forwarding table.

When the source node is the IP base station, if the X link is with less link load, an entry of bearing an IP packet by the ATM network is created in the packet forwarding table, and if the Y link linked to the IP network is with less link load, an entry of bearing an IP packet by the IP network is created in the packet forwarding table. Similarly, when the source node is the ATM base station, if the X link linked to the ATM network is with less link load, an entry of bearing an ATM cell by the ATM network is created in the cell forwarding table, and if the Y link linked to the IP network is with less link load, an entry of bearing an ATM cell by the IP network is created in the cell forwarding table.

In the local forwarding table, for the ATM cell, because the index of a radio data flow is uniquely identified by the ATM Permanent Virtual Circuit (PVC) and AAL2 Connection Identity (CID), the process of configuring a cell forwarding table (the cell forwarding table may be preconfigured in the ATM/IP dual/stack Hub, and the configuration process is to record forwarding link information of a cell in the cell forwarding table) is a process of mapping (or configuring) the ATM PVC and AAL2 CID corresponding to the data flow and the information in the cell forwarding table which indicates the forwarding of the ATM cell to the X or Y link by the signaling negotiation.

For the IP packet, because the index of a radio data flow is uniquely identified by a source IP address, a destination IP address and User Datagram Protocol (UDP) port numbers, the process of configuring a packet forwarding table is a process of mapping (or configuring) the source IP address, the destination IP address and the UDP port numbers (including a UDP source port number and a UPD destination port number) corresponding to the data flow and the information in the packet forwarding table which indicates the forwarding of the IP packet to the X or Y link by the signaling negotiation.

As illustrated in Table 1, the cell forwarding table stores a service flow index (or table lookup contents) of which the received service flow is an ATM cell, and forwarding type information (the source node corresponding to the service flow in Table 1 may be the ATM base station or the ATM/IP dual-stack base station controller), where the forwarding type information includes: link information for selecting an ATM network to send the ATM cell (a mapping relation from an ATM source PVC and a source AAL2 CID to an ATM destination PVC and a destination AAL2 CID) represented by the fields in Table 1, where the PVC information includes Virtual Path Identifier (VPI) information and Virtual Channel Identifier (VCI) information; and link information for selecting an IP network to send the ATM cell (such as entry N in Table 1, a mapping relation from the ATM source PVC and source AAL2 CID to the source IP address, destination IP address, UDP source port number and UDP destination port number).

TABLE 1

Cell forwarding table

| Entry | Table Lookup Contents (Column 1) | | | | Table Lookup Result (Column 2): Forwarding Type | | | |
|---|---|---|---|---|---|---|---|---|
| Entry 1 | Port 1# | VPI 1# | VCI 1# | CID 1# | Port 1' | VPI 1' | VCI 1' | CID 1' |
| Entry 2 | Port 2# | VPI 2# | VCI 2# | CID 2# | Port 2' | VPI 2' | VCI 2' | CID 2' |
| ... | | | | | | | | |
| Entry N | Port N# | VPI N# | VCI N# | CID N# | Source IP Address | Destination IP Address | UDP Source Port # | UDP Destination Port # |

As illustrated in Table 2, the packet forwarding table stores service flow table lookup contents (also known as a table index) of which the received service flow is an IP packet, and the forwarding type information (the source node corresponding to the service flow in Table 2 may be the IP base station or the ATM/IP dual-stack base station controller), where the forwarding type information includes: link information for selecting an ATM network to send the IP packet (such as entries 1 and 2 in Table 2, setting up a mapping relation from the source IP address, destination IP address, UDP source port number and UDP destination port number to the ATM source PVC and source AAL2 CID), and link information for selecting an IP network to send the IP packet (the IP packet is still the same and directly enters an IP routing module for IP routing and forwarding).

TABLE 2

Packet forwarding table

| Entry | Table Lookup Contents (Column 1) | | | | Table Lookup Result (Column 2): Forwarding Type | | | |
|---|---|---|---|---|---|---|---|---|
| Entry 1 | Source IP Address 1 | Destination IP Address 1 | UDP Source Port # 1 | UDP Destination Port # 1 | Port 1' | VPI 1' | VCI 1' | CID 1' |
| Entry 2 | Source IP Address 2 | Destination IP Address 2 | UDP Source Port # 2 | UDP Destination Port # 2 | Port 2' | VPI 2' | VCI 2' | CID 2' |
| ... | | | | | | | | |
| Entry N | Source IP Address N | Destination IP Address N | UDP Source Port # N | UDP Destination Port # N | Routing and forwarding without changing the IP header | | | |

Step S703: The ATM/IP dual-stack Hub notifies a link setup success message to a sender (an ATM base station or an IP base station) of the link setup request of the service flow. For example, by adding the link setup success message to the response message of the link setup request of the service flow, the ATM/IP dual-stack Hub notifies that the sender of the link setup request of the service flow may send a data flow anytime.

Because the signaling negotiation is a process that involves the ATM/IP dual-stack Hub, ATM base station or IP base station, and ATM/IP dual-stack base station controller, the forwarding link information set up by the negotiation may be fed back to the source node by a response message of the link setup request of the service flow. The bearer network from the ATM base station or IP base station to the ATM/IP dual-stack Hub is usually unique, so, when receiving the response message of the ATM/IP dual-stack Hub, the ATM base station sends an ATM cell. For the IP base station, the IP base station sends an IP packet.

Step S704: The ATM/IP dual-stack Hub forwards the service flow according to the forwarding link information of the service flow stored in the local forwarding table. The step specifically includes:

The ATM/IP dual-stack Hub receives the service flow sent from the ATM base station or IP base station, and the table lookup contents of the local forwarding table (the local forwarding table includes the table lookup contents and the forwarding type, and the table lookup contents are consistent with the header information of the service flow) are matched according to the header information of the service flow (the header information of the IP packet is the source IP address, the destination IP address and the UDP port numbers; and the header information of the ATM cell is the ATM PVC and the AAL2 CID) to acquire the forwarding link information of the service flow.

When the forwarding link information indicates that an ATM cell from the ATM base station is transmitted through an IP network, the ATM cell is encapsulated into an IP packet by protocol conversion (terminating the AAL2 protocol of the ATM cell and encapsulating a cell payload of the ATM cell into an IP packet) to forward the encapsulated IP packet to the destination node.

When the forwarding link information indicates that an IP packet from the IP base station is transmitted through an ATM network, the IP packet is encapsulated into an ATM cell by protocol conversion (terminating the UDP protocol of the IP packet and encapsulating a packet payload of the IP packet into an ATM cell) to forward the encapsulated ATM cell to the destination node.

When the forwarding link information indicates that the IP packet from the IP base station or the ATM cell from the ATM base station is transmitted by using the same type networks (corresponding IP or ATM networks), the forwarding processing is carried out directly without converting the protocols.

Step S705: The ATM/IP dual-stack Hub receives the link teardown request of the service flow and deletes the forwarding link information of the service flow.

The local forwarding table is a dynamic forwarding table. When a link setup request of the service flow is received, the forwarding table sets up and stores the forwarding link information of the service flow; and after the communication of the service flow (including the completion of service flow transmission or the abnormal interruption of the forwarding link of the service flow) is complete, the forwarding link information of the service flow is removed when the link teardown request of the service flow is received. The local forwarding table is updated for the correct statistics of the link load information of the current bearer networks. For example, during a voice call, a corresponding link is set up for a session, and the corresponding link information of the session is deleted after the call is completed.

In the embodiment, through the admission control of the signaling plane, during the link setup of an uplink data flow, the load sharing configuration of the data flow is carried out by the signaling negotiation according to the bandwidth utilization of the ATM and IP bearer networks between the ATM/IP dual-stack Hub and the ATM/IP dual-stack base station controller, so that the ATM/IP dual-stack Hub may forward the data flow in equalization between the ATM and IP bearer networks to improve the utilization efficiency of the bearer networks. Because only one ATM/IP dual-stack Hub between the base station (ATM or IP base station) and the ATM/IP dual-stack base station controller is needed to finish the conversion between the IP data flow and the ATM data flow, the equipment purchase cost and maintenance cost are effectively saved.

Yet another embodiment of the present invention applies the method for equalizing flows to the service flow transmission of a downlink in the system illustrated in FIG. 6, including:

Step S801: An ATM/IP dual-stack Hub receives a link setup request of the service flow sent from an ATM/IP dual-stack base station controller.

Step S802: The ATM/IP dual-stack Hub acquires link load information of an ATM network and an IP network between the ATM/IP dual-stack Hub and the ATM/IP dual-stack base station controller according to the link setup request of the service flow, and selects a bearer network with a less link load to set up a forwarding link for the service flow.

In the step, the ATM/IP dual-stack Hub may acquire the link load information of the current ATM network and IP network according to the flow statistics of ports of X and Y links. If the current X link is with less link load, the service flow sent from the ATM/IP dual-stack base station controller is configured to be forwarded to the ATM/IP dual-stack Hub through the X link so as to be further relayed to an ATM or IP base station. Conversely, the service flow is forwarded to the ATM/IP dual-stack Hub through the Y link so as to be further relayed to the ATM or IP base station.

The process of setting up a link includes a complete link from the ATM/IP dual-stack base station controller to the ATM/IP dual-stack Hub and further to the ATM or IP base station.

In the step, the forwarding link information of the service flow stored in the local forwarding table is identical to those in Tables 1 and 2, thus needing no further description.

Step S803: The ATM/IP dual-stack Hub notifies a link setup success message to the ATM/IP dual-stack base station controller. For example, by adding the link setup success message to the response message of the link setup request of the service flow, the ATM/IP dual-stack Hub notifies that the ATM/IP dual-stack base station controller may send a data flow anytime.

In the step, because the signaling negotiation is a process that involves the ATM/IP dual-stack Hub, ATM base station or IP base station, and ATM/IP dual-stack base station controller, the forwarding link information set up by the negotiation may be fed back to the source node by the response message. Because the ATM/IP dual-stack base station controller is the source of the service flow, the useful information in the service flow is encapsulated into an IP packet (if the signaling link is set up in the IP network) or an ATM cell (if the signaling link is set up in the ATM network).

Step S804: The ATM/IP dual-stack Hub forwards the service flow according to the forwarding link information of the service flow stored in the local forwarding table. The step specifically includes:

The ATM/IP dual-stack Hub matches the table lookup contents in a local forwarding table according to header information of the service flow (the header information of the IP packet is a source IP address, a destination IP address and UDP port numbers; and the header information of the ATM cell is an ATM PVC and an AAL2 CID) so as to acquire the forwarding link information of the service flow.

When the forwarding link information indicates that the link set up for the service flow is a link from the ATM/IP dual-stack base station controller to the ATM/IP dual-stack Hub through the ATM network, then to the IP base station through the IP network, the ATM/IP dual-stack Hub performs protocol conversion for the received ATM cell, terminates the AAL2 protocol and encapsulates a cell payload of the ATM cell into an IP packet, and changes the destination IP address into the IP base station to send the encapsulated packet to the IP base station.

When the forwarding link information indicates that the link set up for the service flow is a link from the ATM/IP dual-stack base station controller to the ATM/IP dual-stack Hub through the IP network, then to the ATM base station through the ATM network, the packet sent from the ATM/IP dual-stack base station controller is an IP packet. The ATM/IP dual-stack Hub performs protocol conversion for the IP packet sent from the ATM/IP dual-stack base station controller, terminates the UDP, and changes the IP address of the IP packet, UDP port numbers, and so on, into a VPI/VCI of the ATM base station to send the encapsulated cell to the ATM base station.

When the forwarding link information indicates that the link set up for the service flow is a link from the ATM/IP dual-stack base station controller to the ATM/IP dual-stack Hub through the ATM network, then to the ATM base station through the ATM network, or from the ATM/IP dual-stack base station controller to the ATM/IP dual-stack Hub through the IP network, then to the IP base station through the IP network, the forwarding processing is carried out directly without converting the protocols.

Step S805: The ATM/IP dual-stack Hub receives a link teardown request of the service flow and deletes the forwarding link information of the service flow. The step is similar to step S705 of the second embodiment, thus needing no further description.

In the embodiment, through the admission control of the signaling plane, during the link setup of a downlink data flow, the load sharing configuration of the data flow is carried out by the signaling negotiation according to the bandwidth utilization of the ATM and IP bearer networks between the ATM/IP dual-stack Hub and the ATM/IP dual-stack base station controller, so that the ATM/IP dual-stack Hub may receive the service flow from the ATM/IP dual-stack base station controller in equalization between the ATM and IP bearer networks to improve the utilization efficiency of the bearer networks. Because only one ATM/IP dual-stack Hub between the base station (ATM or IP base station) and the ATM/IP dual-stack base station controller is needed to finish the conversion between the IP data flow and the ATM data flow, the equipment purchase cost and maintenance cost are effectively saved.

Figure 8:
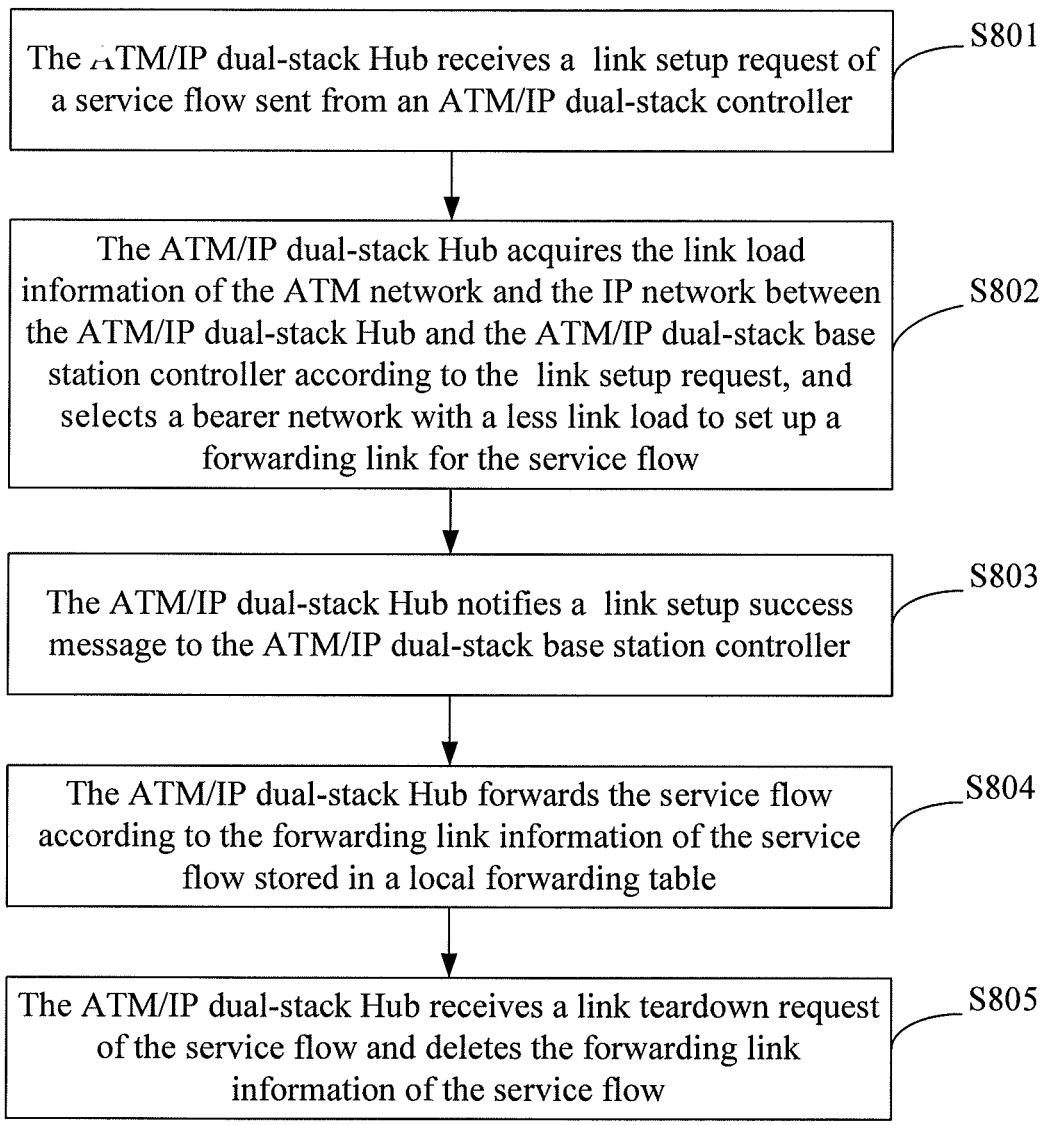
FIG. 8 illustrates a flowchart of a method for equalizing flows in yet another embodiment of the present invention.

In the two embodiments corresponding to FIG. 7 and FIG. 8, during the forwarding of a packet, when the ATM/IP dual-stack Hub transmits an ATM cell through an IP network, or an IP packet through an ATM network, protocol conversion is needed. The conversion process includes: terminating the AAL2 protocol of the ATM cell to encapsulate the cell payload of the ATM cell into an IP packet; or terminating the UDP protocol of the IP packet to encapsulate the packet payload of the IP packet into an ATM cell.

Figure 4:
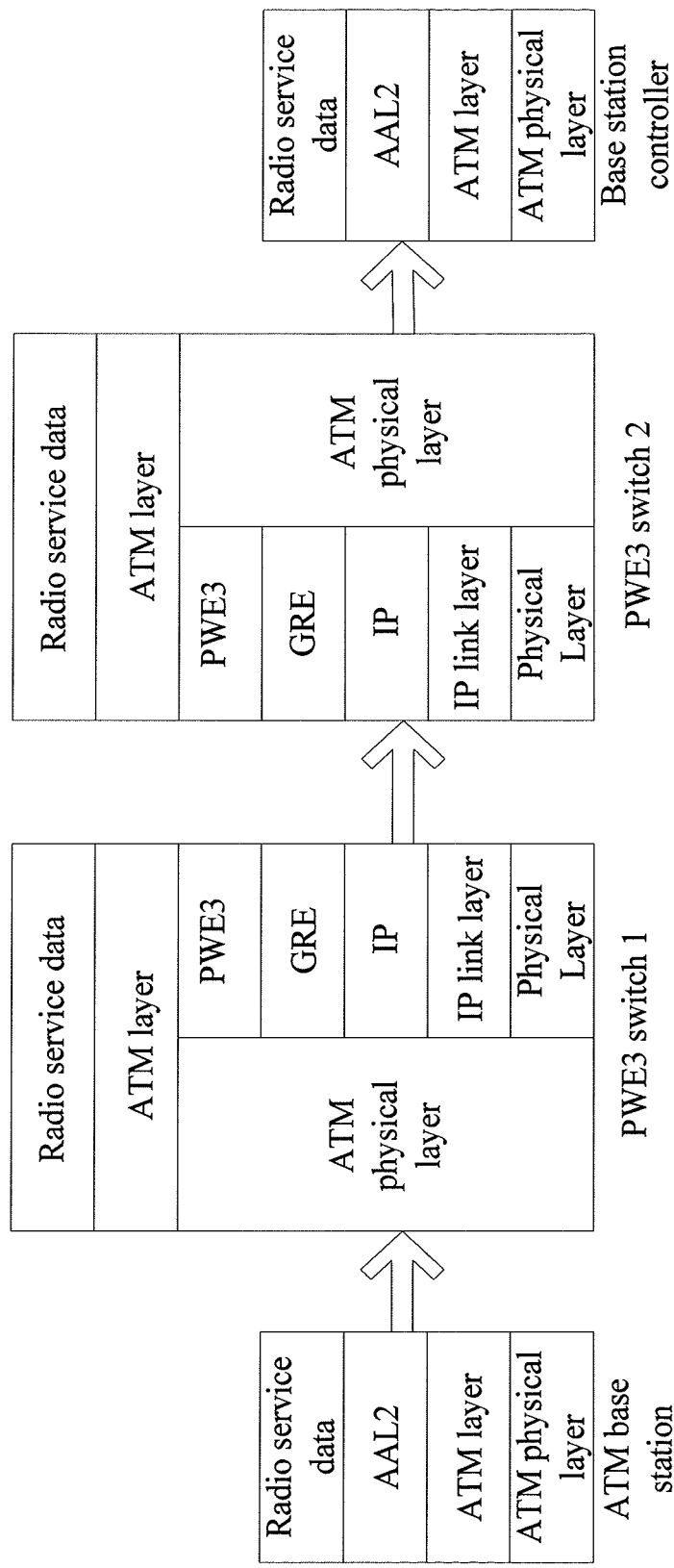
FIG. 4 illustrates a schematic diagram of conversion of a protocol stack bearer of the PWE3 protocol networking in the second solution of the prior art.
Figure 9:
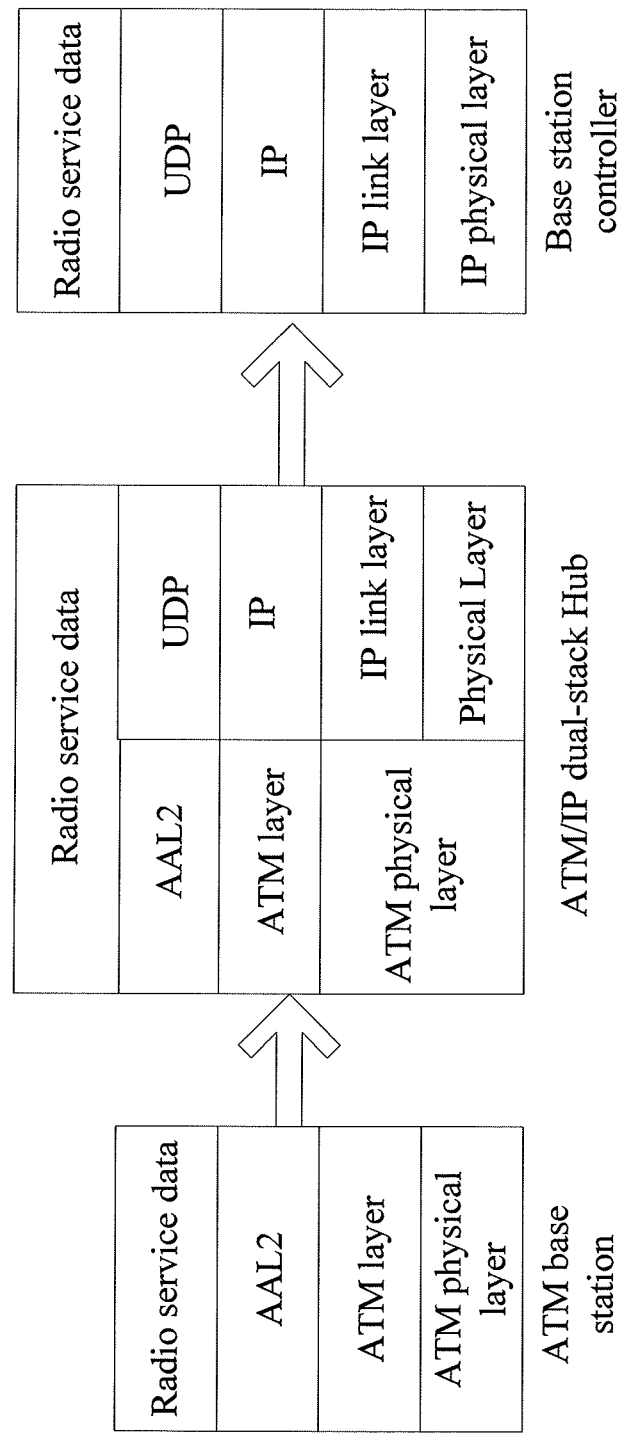
FIG. 9 illustrates conversion of a protocol stack where an ATM cell is converted into an IP packet for transmission on an IP bearer network in an embodiment of the present invention.

In the system architecture illustrated in FIG. 6, an ATM base station sends a service flow, and, when forwarding link information of the service flow set up by the ATM/IP dual-stack Hub indicates transmission through the IP network to the ATM/IP dual-stack base station controller, protocol conversion is performed. The encapsulation structure of the service flow in a forwarding link is illustrated in FIG. 9. The protocol conversion in FIG. 9 is different from the bearer mode of the PWE3 protocol in FIG. 4. The processing scheme of the PWE3 protocol is to encapsulate an entire ATM cell and convert the entire ATM cell twice. Therefore, it can be known from the figures that the bearer mode in the embodiment of the present invention has a lower protocol layer and higher transmission efficiency than those of the PWE3 protocol. Moreover, the ATM base station and the ATM/IP dual-stack base station controller do not need two conversion devices there between, and thus costs are saved.

Figure 1:
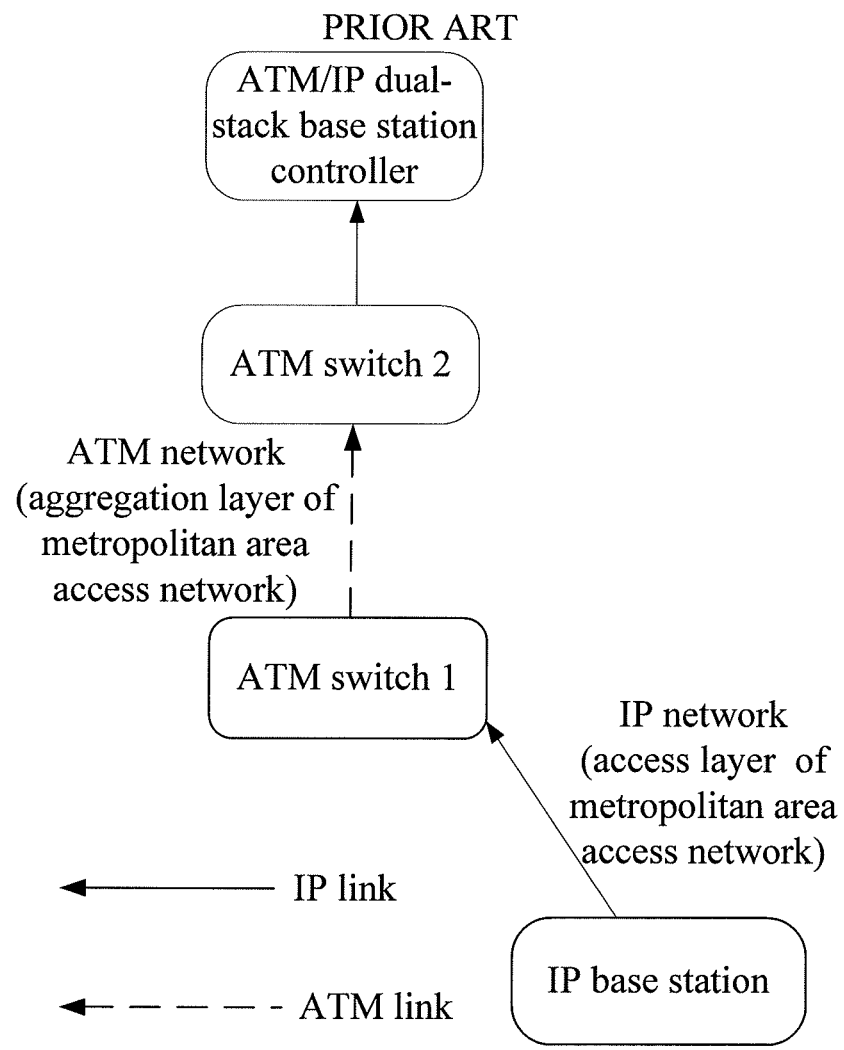
FIG. 1 illustrates a schematic diagram of an architecture of an IPoA protocol networking in a first solution of the prior art.
Figure 2:
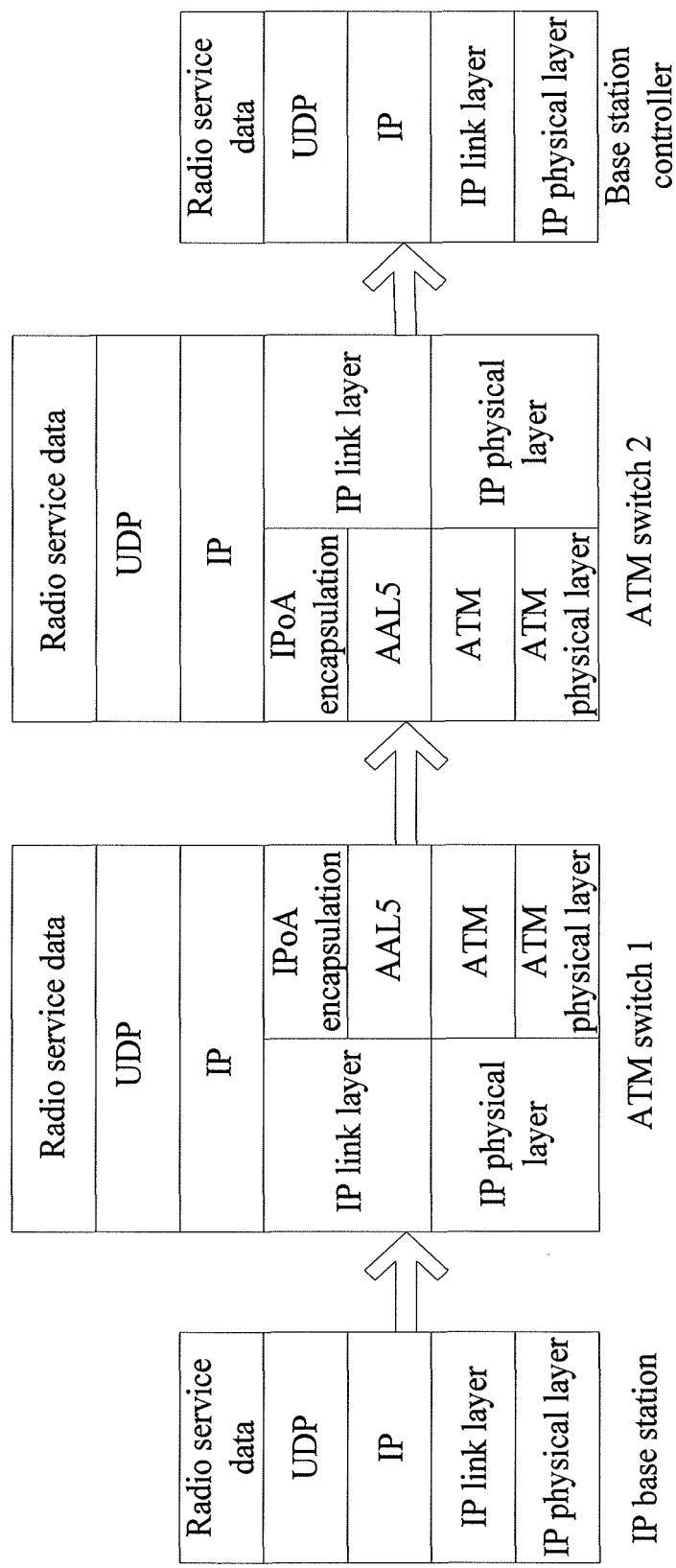
FIG. 2 illustrates a schematic diagram of conversion of a protocol stack bearer of an IPoA protocol networking in the first solution of the prior art.
Figure 3:
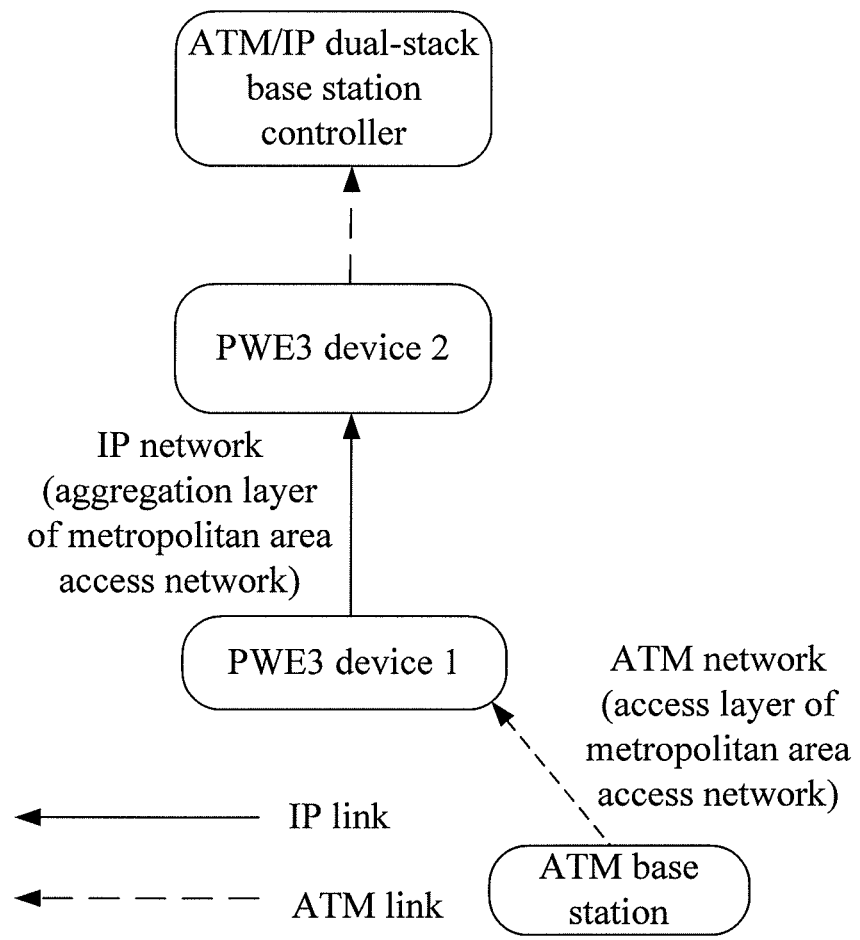
FIG. 3 illustrates a schematic diagram of an architecture of a PWE3 protocol networking in a second solution of the prior art.
Figure 10:
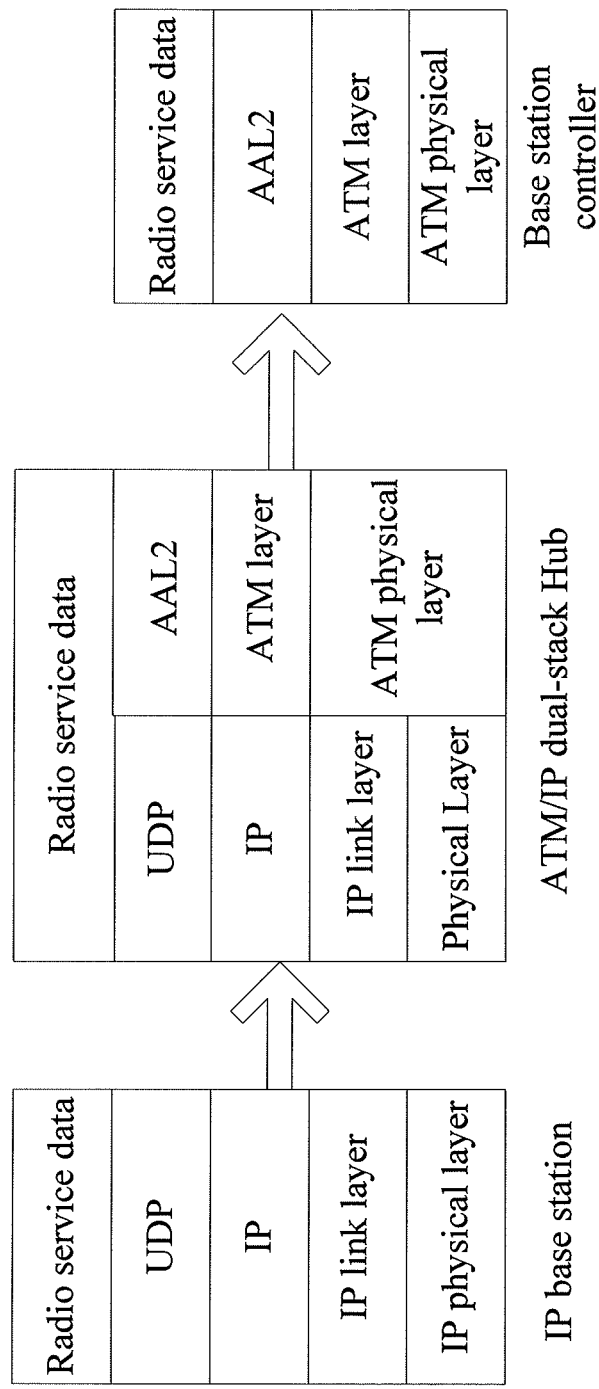
FIG. 10 illustrates conversion of a protocol stack where an IP packet is converted into an ATM cell for transmission on an ATM bearer network in an embodiment of the present invention.

Similarly, an IP base station sends a service flow, and, when the ATM/IP dual-stack Hub selects an ATM network as a bearer network for transmission to the ATM/IP dual-stack base station controller, the protocol stack during the service flow forwarding is illustrated in FIG. 10. Likewise, it can be known according to the comparison between FIG. 10 and FIG. 2 that the protocol conversion in the embodiment of the present invention has a lower protocol layer and higher transmission efficiency than the conversion of the IPoA protocol and thus costs are saved.

When an ATM cell sent from the ATM/IP dual-stack base station controller needs to be sent to the IP base station, or the IP packet sent from the ATM/IP dual-stack base station controller needs to be transmitted to the ATM base station, the bearer mode is similar to the two cases above, and thus no further description is needed.

An embodiment provides a system for equalizing flows, including: a source node, a relay node, and a destination node.

The source node is configured to send a service flow and a link setup request of the service flow of the service flow.

The relay node is configured to: receive the link setup request of the service flow sent from the source node; acquire link load information of each bearer network between the source node and the destination node according to the link setup request of the service flow, and select a bearer network with a less link load to set up a forwarding link for the service flow; and forward the service flow according to the forwarding link.

The destination node is configured to receive the service flow forwarded by the relay node.

The relay node may be the ATM/IP dual-stack Hub. The source node may be any one of the ATM base station, the IP base station and the ATM/IP dual-stack base station controller; and when the source node is the ATM or IP base station, the destination node is the ATM/IP dual-stack base station controller, and when the source node is the ATM/IP dual-stack base station controller, the destination node is the ATM or IP base station.

Figure 11:
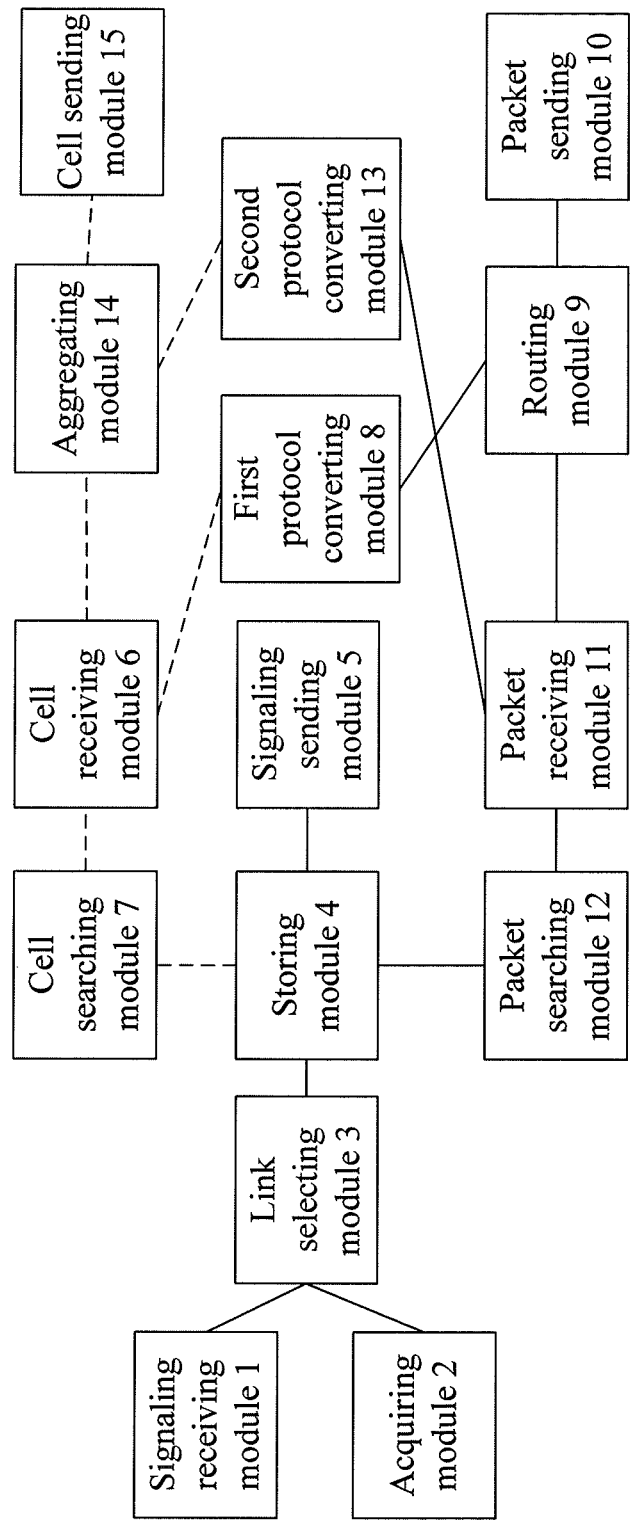
FIG. 11 illustrates a structure diagram of an apparatus for equalizing flows in an embodiment of the present invention.

The relay node may be the ATM/IP dual-stack Hub. As illustrated in FIG. 11, the relay node includes:

a signaling receiving module 1 configured to receive a link setup request of the service flow sent from a source node;

an acquiring module 2 configured to acquire link load information of each bearer network between the source node and the destination node according to the link setup request of the service flow; and a link selecting module 3 configured to select a bearer network with a less link load to set up a forwarding link for the service flow according to the link load information of the bearer network.

As an alternative embodiment, the relay node further includes:

a storing module 4, configured to store the forwarding link information for the service flow into a local forwarding table, and further configured to receive a link teardown request of the service flow and delete the forwarding link information of the service flow. Alternatively, the link teardown request of the service flow may be acquired by the signaling receiving module 1.

In addition to the storing module 4, the relay node further includes: a signaling sending module 5, configured to notify a link setup success message to the source node;

As an alternative embodiment, the relay node further includes the following modules: a cell receiving module 6, configured to receive an ATM cell sent from the source node;

a cell searching module 7, configured to search a cell forwarding table in the local forwarding table according to the header information in the ATM cell and acquire the forwarding link information of the ATM cell;

a first protocol converting module 8, configured to encapsulate the ATM cell into an IP packet;

a routing module 9, configured to allocate a route to the IP packet; and a packet sending module 10, configured to send the IP packet.

As an alternative embodiment, the relay node further includes the following modules: a packet receiving module 11, configured to receive the IP packet sent from the source node;

a packet searching module 12, configured to search a packet forwarding table in the local forwarding table according to header information in the IP packet and acquire forwarding link information of the IP packet;

a second protocol converting module 13, configured to encapsulate the IP packet into an ATM cell;

a aggregating module 14, configured to aggregate the ATM cell; and a cell sending module 15, configured to send the ATM cell.

As an alternative embodiment, the relay node includes all the above modules illustrated in FIG. 11. Using the apparatus illustrated in FIG. 11 and taking the ATM/IP dual-stack Hub as an example, the interactive process of each module includes:

The signaling receiving module 1 receives a link setup request of the service flow sent from the source node (any one of the ATM base station, IP base station and ATM/IP dual-stack base station controller); the link selecting module 3 selects a bearer network with a less link load to set up a forwarding link according to the load of current data flows, acquired by the acquiring module 2, of the ATM and IP ports connected with the ATM/IP dual-stack base station controller, stores the forwarding link information in the cell forwarding table of the storing module 4, and notifies the source node to send the service flow anytime through the signaling sending module 5.

When the ATM/IP dual-stack Hub receives an ATM cell through the cell receiving module 6, or receives an IP packet through the packet receiving module 11, the cell searching module 7 searches the cell forwarding table of the storing module 4 (or the packet searching module 12 searches the packet forwarding table of the storing module 4) to acquire the forwarding link information. With respect to the forwarding link information, the following cases exist.

Case 1: When the forwarding link information indicates that the ATM cell is transmitted through an IP network, the ATM cell is encapsulated into an IP packet by the protocol conversion in the first protocol converting module 8, and the IP packet is allocated a route by the routing module 9 and sent to the destination node by the packet sending module 10.

Case 2: When the forwarding link information indicates that the ATM cell is transmitted through an ATM network, the ATM cell undergoes the PVC switching or the AAL2 switching by the aggregating module 14 and is aggregated into an ATM cell, which is then sent by the cell sending module 15.

In cases 1 and 2, when the source node is the ATM base station, the destination node is the ATM/IP dual-stack base station controller; and when the source node is the ATM/IP dual-stack base station controller, the destination node is the ATM base station.

Case 3: When the forwarding link information indicates that the IP packet is transmitted through an ATM network, the IP packet is encapsulated into an ATM cell by the protocol conversion in the second protocol converting module 13, and the ATM cell undergoes the PVC switching or the AAL2 switching by the aggregating module 14 and is aggregated into an ATM cell, which is then sent by the cell sending module 15.

Case 4: When the forwarding link information indicates that the IP packet is transmitted through an IP network, the IP packet received by the packet receiving module 11 is directly allocated a route by the routing module 9 and sent by the packet sending module 10.

Likewise, in cases 3 and 4, when the source node is the IP base station, the destination node is the ATM/IP dual-stack base station controller; and when the source node is the ATM/IP dual-stack base station controller, the destination node is the IP base station.

During the process above, the dashed lines and solid lines in FIG. 11 represent the links of the ATM cell and IP packet respectively.

The equalization of service flows is implemented by the apparatus provided by the embodiment to improve the performance of the system.

On the basis of the description of the embodiments above, the technical solution of the embodiments of the present invention has the following advantages:

Through the admission control of the signaling plane, during the setup of a data flow, the link load information of the current multiple bearer networks between the relay node and the source node, and between the relay node and the destination node is acquired by the signaling negotiation of the relay node, the source node and the destination node, and a bearer network with a less link load is selected for the load sharing configuration of the data flow, thus improving the utilization efficiency of the bearer networks. In the architecture illustrated in FIG. 6, because only one ATM/IP dual-stack Hub between the base station (ATM or IP base station) and the ATM/IP dual-stack base station controller can finish the conversion between the IP data flow and the ATM data flow, the equipment purchase cost and maintenance cost are effectively saved.

Those skilled in the art may understand that the drawings are schematic diagrams of a preferred embodiment, and that the modules or processes inside are not necessarily mandatory for implementing the invention.

Those skilled in the art may understand that the modules in the apparatus of the embodiments may be distributed in an apparatus according to the description of each embodiment, or distributed in one or more apparatuses different from the apparatus of the embodiments. The modules of the embodiments may be combined into a module or further divided into multiple sub-modules.

The sequence number for each embodiment of the present invention is only for description, not used for representing the priority of each embodiment.

The technical solution in the claims also falls within the scope of protection of the embodiments of the present invention.

On the basis of the description of the embodiments above, those skilled in the art may clearly understand that the invention may be implemented by hardware or by software with a necessary general hardware platform. According to such understandings, the technical solution of the invention may be embodied in the form of a software product which may be stored in a non-volatile storage medium (such as a Compact Disk-Read Only Memory (CD-ROM), a USB disk and a mobile hard disk) and include multiple instructions to enable a computer device (such as a personal computer, a server and a network device) to execute the method of each embodiment of the present invention.

To sum up, described above are only preferred embodiments of the present invention, and the scope of protection of the invention is not limited herein. Any modifications, equivalent replacements, improvements and the like within the spirit and principle of the invention shall fall within the scope of protection of the invention.

What is claimed is:

1. A method for equalizing flows, comprising:
   receiving, by a relay node, a link setup request of a service flow sent from a source node;
   acquiring, by the relay node, link load information of each bearer network between the source node and a destination node according to the link setup request of the service flow, and selecting a bearer network with a less link load to set up a forwarding link for the service flow;
   storing, by the relay node, the forwarding link information of the service flow in a local forwarding table; and
   forwarding, by the relay node, the service flow according to the forwarding link in the local forwarding table;
   wherein the source node is an Asynchronous Transfer Mode/Internet Protocol (ATM/IP) dual-stack base station controller, the relay node is an ATM/IP dual-stack Hub, when the destination node is an ATM base station, and the bearer network of the forwarding link between the ATM/IP dual-stack Hub and the ATM/IP dual-stack base station controller is an ATM network, the forwarding the service flow by the relay node according to the forwarding link information in the local forwarding table comprises:
   receiving an ATM cell sent from the ATM/IP dual-stack base station controller;

searching the local forwarding table according to header information of the ATM cell, and acquiring forwarding link information of the ATM cell; and forwarding the ATM cell to the ATM base station according to the forwarding link information.

2. The method according to claim 1, after selecting the bearer network with a less link load to set up the forwarding link for the service flow, further comprising:

notifying, by the relay node, a link setup success message to the source node.

3. The method according to claim 1, further comprising:

receiving, by the relay node, a link teardown request of the service flow;

removing, by the relay node, the forwarding link information of the service flow in the local forwarding table according to the link teardown request; and updating, by the relay node, the local forwarding table.

4. The method according to claim 1, wherein, the method further comprises: when the destination node is an IP base station, and the bearer network of the forwarding link between the ATM/IP dual-stack Hub and the ATM/IP dual-stack base station controller is an ATM network, the forwarding the service flow by the relay node according to the forwarding link information in the local forwarding table comprises:

receiving an ATM cell sent from the ATM/IP dual-stack base station controller;

searching the local forwarding table according to header information of the ATM cell, and acquiring forwarding link information of the ATM cell; and encapsulating the ATM cell into an IP packet according to the forwarding link information, and forwarding the encapsulated IP packet to the IP base station.

5. The method according to claim 1, wherein, the method further comprises: when the destination node is an ATM base station, and the bearer network of the forwarding link between the ATM/IP dual-stack Hub and the ATM/IP dual-stack base station controller is an IP network, the forwarding the service flow by the relay node according to the forwarding link information in the local forwarding table comprises:

receiving an IP packet sent from the ATM/IP dual-stack base station controller;

searching the local forwarding table according to header information of the IP packet, and acquiring forwarding link information of the IP packet; and encapsulating the IP packet into an ATM cell according to the forwarding link information, and forwarding the ATM cell to the ATM base station.

6. The method according to claim 1, wherein, the method further comprises: when the destination node is an IP base station, and the bearer network of the forwarding link between the ATM/IP dual-stack Hub and the ATM/IP dual-stack base station controller is an IP network, the forwarding the service flow by the relay node according to the forwarding link information in the local forwarding table comprises:

receiving an IP packet sent from the ATM/IP dual-stack base station controller;

searching the local forwarding table according to header information of the IP packet, and acquiring forwarding link information of the IP packet; and forwarding the IP packet to the IP base station according to the forwarding link information.

7. An apparatus for equalizing flows, comprising:

a signaling receiving module configured to receive a link setup request of the service flow sent from a source node;

an acquiring module configured to acquire link load information of each bearer network between the source node and a destination node according to the link setup request of the service flow;

a link selecting module configured to select a bearer network with a less link load to set up a forwarding link for a service flow according to the link load information of the bearer network;

a storing module configured to store the forwarding link information of the service flow in a local forwarding table;

a cell receiving module configured to receive an Asynchronous Transfer Mode (ATM) cell sent from the source node;

a cell searching module configured to search a cell forwarding table in the local forwarding table according to header information of the ATM cell and acquire forwarding link information of the ATM cell;

a first protocol converting module configured to encapsulate the ATM cell into an Internet Protocol (IP) packet;

a routing module configured to allocate a route to the IP packet; and a packet sending module configured to send the IP packet.

8. The apparatus according to claim 7, further comprising:

a signaling sending module configured to notify a link setup success message to the source node.

9. The apparatus according to claim 7, further comprising:

a packet receiving module configured to receive an IP packet sent from the source node;

a packet searching module configured to search a packet forwarding table in the local forwarding table according to header information of the IP packet and acquire forwarding link information of the IP packet;

a second protocol converting module configured to encapsulate the IP packet into an Asynchronous Transfer Mode (ATM) cell;

an aggregating module configured to aggregate the ATM cell; and a cell sending module configured to send the ATM cell.

10. A system for equalizing flows, comprising a source node, a relay node according to claim 7 and a destination node, wherein:

the source node is configured to send a service flow and a link setup request of the service flow of the service flow, the service flow comprises an Asynchronous Transfer Mode (ATM) cell;

the relay node receives the ATM cell and sends an Internet Protocol (IP) packet encapsulated by the first protocol converting module of the relay node to the destination node;

the destination node is configured to receive the service flow forwarded by the relay node.

* * * * *